April 28, 1953 — P. E. BLACKMOND — 2,636,747
WHEELBARROW WITH TUB AND HOSE REEL ATTACHMENTS
Filed Feb. 24, 1950 — 2 SHEETS—SHEET 1

INVENTOR.
PAUL E. BLACKMOND
BY Walter E. Shimer
ATTY.

April 28, 1953  P. E. BLACKMOND  2,636,747
WHEELBARROW WITH TUB AND HOSE REEL ATTACHMENTS
Filed Feb. 24, 1950  2 SHEETS—SHEET 2

INVENTOR.
PAUL E. BLACKMOND
BY Walter E. Schirmer
ATTY.

Patented Apr. 28, 1953

2,636,747

UNITED STATES PATENT OFFICE 2,636,747

WHEELBARROW WITH TUB AND HOSE REEL ATTACHMENTS

Paul E. Blackmond, Niles, Mich.

Application February 24, 1950, Serial No. 146,079

3 Claims. (Cl. 280—52)

My invention relates generally to barrows and, more specifically, is directed to a barrow for supporting selectively either a wheel barrow tub or a hose reel.

It is an object of my invention to provide a barrow of a character which may be utilized for supporting selectively either a wheel barrow tub or a hose reel.

I propose to accomplish the above object by providing a frame which extends substantially horizontally when in a normal position, which frame comprises a pair of spaced bar members adapted at one of their ends to be gripped by an operator and at their other ends are bent angularly downwardly toward each other, and supported on either side of an axle and wheel assembly. Mounted intermediate of the ends of the bar members are collapsible or folding supporting legs, which in their extended position, together with the aforementioned axle and wheel assembly, are adapted to support the frame in a substantially horizontal position.

In order to maintain the horizontal bar members in spaced relation, a transversely extending bar member is provided for interconnecting the latter adjacent the forward ends thereof. To provide additional rigidity, a transversely extending container member is provided for interconnecting the horizontal bar members adjacent the rear ends thereof.

A pair of vertically downwardly extending hook members are secured one to each of the horizontal bar members, intermediate of the transversely extending bar member and the transversely extending container. These hook members are adapted to support the ends of an axle of a hose reel, which axle ends may be inserted or removed easily therefrom. When the axle of a hose reel is supported by the hook members, the supporting legs of the barrow may be collapsed and the latter transported by an operator to any desired location. When the supporting legs are extended for supporting the barrow frame on the ground, a hose may be wound or unwound from the reel.

A pair of laterally inwardly extending bolt members having enlarged heads are secured one to each of the horizontal bar members intermediate of the hook members and the transversely extending container. These bolt members are adapted to cooperate with C-shaped ears or lugs mounted to the bottom portion of a wheel barrow tub for securing the latter to the barrow. The wheel barrow tub is additionally secured at its forward end to the transversely extending bar member by means of one or more spring metal clips. By providing a mounting means between the barrow and the wheel barrow tub, of the character described, the wheel barrow tub may be attached or detached speedily from the barrow.

From the above description it will be understood that the barrow of my present invention may be utilized selectively for supporting either a wheel barrow tub or a hose reel and for transporting the same.

A further object of my present invention is to provide a barrow of simple construction, and one which is economical to fabricate.

Now, in order to acquaint those skilled in the art with the manner of constructing and using devices in accordance with the principles of my present invention, I shall describe in connection with the accompanying drawings a preferred embodiment of my invention.

Figure 4:
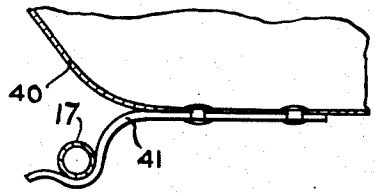
Figure 5:
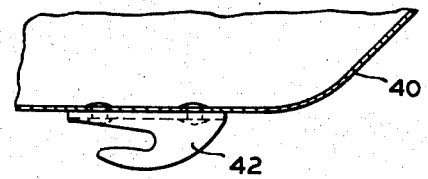

Figure 4 is a vertical sectional view showing one of the spring metal clips which is carried by the wheel barrow tub for mounting the forward end of the latter to the transversely extending bar member of the barrow; and Figure 5 is a vertical sectional view showing the C-shaped lug which is carried by the wheel barrow tub for mounting the rear end of the latter to the laterally inwardly extending bolt members secured to the barrow frame.

Figure 1:
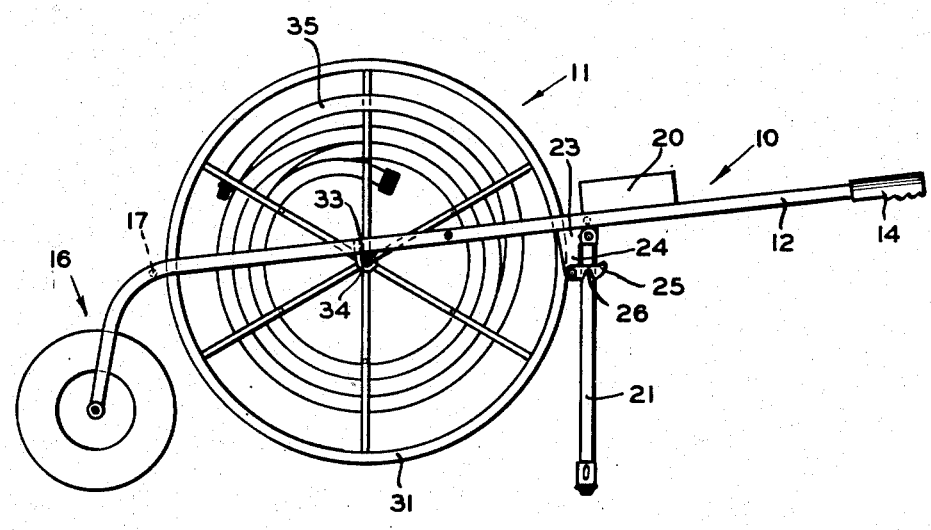
Figure 1 is a side elevational view of the barrow of my present invention, to which is mounted a hose reel.
Figure 3:
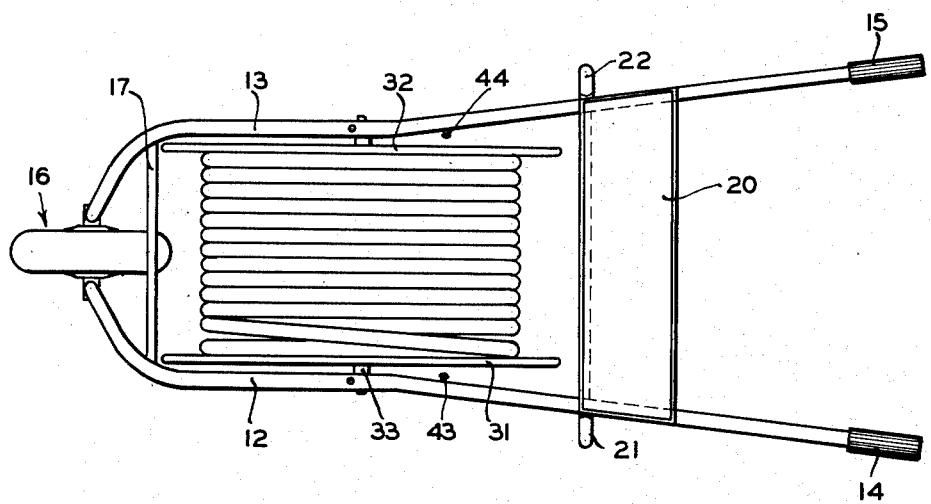
Figure 3 is a plan view of the barrow and hose reel shown in Figure 1.

Referring now to Figure 1, there is shown a barrow, indicated generally by the reference numeral 10, to which a hose reel, indicated generally by the reference numeral 11, is detachably mounted. The barrow, as shown in Figures 1 and 3, comprises a pair of spaced apart bar members 12 and 13 which, when the barrow is in its normal position, lie substantially in a horizontal plane. The bar members 12 and 13, intermediate of the ends thereof, diverge away from each other and at the ends of the divergent portions are provided with handle grips 14 and 15, which may be formed of any suitable resilient material, such as rubber. The bar members 12 and 13 at their forward ends are bent angularly downwardly toward each other, and are suitably supported upon an axle and wheel assembly, indicated at 16. A transversely extending brace member 17 interconnects the bar members 12 and 13 adjacent the forward ends thereof for maintaining them in proper spaced relation. To provide additional stability to the barrow frame, a transversely extending auxiliary open top container 20 is provided for interconnecting the bar members 12 and 13, intermediate of their divergent portions.

In order to support the barrow frame in a substantially horizontal position, a pair of vertically downwardly extending legs 21 and 22 are provided one adjacent each side of the barrow frame. The legs 21 and 22 are pivotally mounted at their upper ends to a pair of vertically downwardly extending flange members 23, which flange members 23 are secured one to each of the bar members 12 and 13, intermediate of the divergent portions thereof. The flanges 23 are provided with extension portions 24 to which, at the lower ends thereof, are pivotally mounted a pair of latch members 25, which have slots formed therein for cooperating with laterally outwardly extending pin members 26 mounted to the legs 21 and 22.

It will be understood that since the leg members 21 and 22 are pivotally mounted adjacent their upper ends to the flange members 23, they may be folded or collapsed upwardly toward the handle ends of the bar members 12 and 13. After being folded upwardly, the legs 21 and 22 may be secured in a conventional manner to the bar members 12 and 13 so as to permit an operator to transport the barrow 10 from one location to another. When it is desired to support the bar members 12 and 13 of the barrow 10 in a normally horizontal position, the legs 21 and 22 may be extended downwardly so that the bottom ends thereof contact the ground. In order to maintain the legs in this position, the latch members 25 are positioned so that the V-shaped grooves therein are disposed about the pin members 26 of the leg members 21 and 22.

The hose reel 11 is of conventional construction and comprises a pair of spaced apart vertically extending frame members 31 and 32, which are suitably supported upon an axle 33. The ends of the axle 33 of the hose reel 11 are supported by means of a pair of vertically downwardly extending hook members 34, which are secured one to each of the horizontal bar members 12 and 13, intermediate of the transversely extending brace member 17 and the transversely extending auxiliary container 20.

When it is desired to pick up a hose reel with the barrow 10 of my present invention, the legs 21 and 22 of the latter are collapsed and the bar members 12 and 13 are disposed about the hose reel 11 and then manipulated until the hook members 34 are located about the ends of the axle 33 of the hose reel 11. Then by lifting the bar members 12 and 13 at the grips 14 and 15, the reel 11 is raised from the ground and may be transported to any desired location. If it should be desired to unreel a hose 35 from the hose reel 11, the legs 21 and 22 of the barrow 10 are extended to their supporting position. The hose 35 may then be withdrawn, while the hose reel 11 pivots on its shaft 33 about the hook members 34 in a counterclockwise direction, as viewed in Figure 1. Conversely, when it is desired to wind the hose 35 upon the reel 11, the reel need only be wound in the opposite direction, that is—clockwise—as viewed in Figure 1.

The hose reel 11 may be removed by collapsing the legs 21 and 22, and lowering the bar members 12 and 13 of the barrow 10 until the reel 11 contacts the ground. Then by maneuvering the bar members 12 and 13, the ends of the shaft 33 of the hose reel 11 may be released from the hook members 34.

Figure 2:
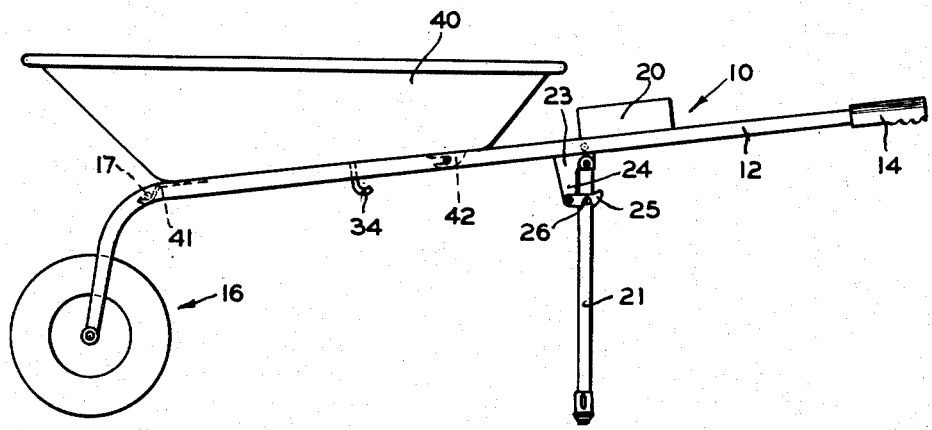
Figure 2 is a side elevational view of the barrow of my present invention, to which is mounted a wheel barrow tub.

The barrow 10 of my present invention is also adapted to support a wheel barrow tub 40, as shown in Figure 2. The bottom of the wheel barrow tub 40 adjacent the forward end thereof is provided with a plurality of spring metal clips 41, which are riveted thereto in a suitable manner, as shown in Figure 4. The bottom of the wheel barrow tub 40 is provided, adjacent its rear end, with a pair of spaced apart C-shaped lug members 42 which extend vertically downwardly and are riveted thereto, as shown in Figure 5.

A pair of laterally inwardly extending bolt members 43 and 44, having enlarged head portions, are mounted to the bar members 12 and 13, respectively, intermediately of the transversely extending auxiliary container 20 and the downwardly extending hook members 34.

In mounting the wheel barrow tub 40 to the barrow 10, the legs 21 and 22 are extended into supporting position. Then the wheel barrow tub 40 is placed on the upper edges of the bar members 12 and 13, and slid therealong toward the forward end thereof. In this manner, the pair of spaced C-spaced lug members 42 are adapted to engage with the bolt members 43 and 44, and the plurality of spring metal clips 41 are adapted to engage with the transversely extending brace member 17. After the spring metal clips 41 have snapped into position about the transversely extending brace member 17, the wheel barrow tub 40 is held against sidewise movement, endwise movement, and vertical movement with respect to the bar members 12 and 13.

From the foregoing description, it will be seen that I have provided a barrow of simple and economical construction which may be utilized for supporting and transporting either a wheel barrow tub 40 or a hose reel 11.

While I have described and shown what I believe to be a preferred embodiment of my present invention, it will be understood that various modifications and rearrangements may be made therein without departing from the spirit and scope of my present invention.

I claim:

1. For use selectively with a hose reel having an axle and a wheel barrow tub having a plurality of spring clip members secured to the bottom portion adjacent the forward end thereof and a pair of spaced apart vertically downwardly extending C-shaped lug members secured to the bottom portion adjacent the rear end thereof, the combination of a convertible barrow comprising a pair of spaced apart bar members which extend normally substantially horizontally, said bar members at their forward ends being supported by an axle and wheel assembly, a pair of vertically downwardly extending hook members one secured to each of said bar members intermediate of the ends thereof, said hook members being adapted to cooperate with the ends of the axle of the hose reel for supporting the latter, a transversely extending brace member interconnecting said bar members adjacent the forward ends thereof, said transversely extending bar member being adapted to cooperate with the spring clip members at the forward end of the wheel barrow tub, laterally inwardly extending bolt members one secured to each of said bar members intermediate of the ends thereof, and said bolt members being adapted to cooperate one with each of the C-shaped lug members at the rear end of the wheel barrow tub.

2. For use selectively with a hose reel having an axle and a wheel barrow tub having a plurality of spring clip members secured to the bottom portion adjacent the forward end thereof and a pair of spaced apart vertically downwardly extending C-shaped lug members secured to the bottom portion adjacent the rear end thereof, the combination of a convertible barrow comprising a pair of spaced apart bar members which extend normally substantially horizontally, said bar members at their forward ends being supported by an axle and wheel assembly, a pair of collapsible legs one pivotally mounted to each of said bar members intermediate of the ends thereof, a pair of vertically downwardly extending hook members one secured to each of said bar members intermediate of the ends thereof, said hook members being adapted to cooperate with the ends of the axle of the hose reel for supporting the latter, a transversely extending brace member interconnecting said bar members adjacent the forward ends thereof, said transversely extending bar member being adapted to cooperate with the spring clip members at the forward end of the wheel barrow tub, laterally inwardly extending bolt members one secured to each of said bar members intermediate of the ends thereof, and said bolt members being adapted to cooperate one with each of the C-shaped lug members at the rear end of the wheel barrow tub.

3. For use selectively with a hose reel having an axle and a wheel barrow tub having a plurality of spring clip members secured to the bottom portion adjacent the forward end thereof and a pair of spaced apart vertically downwardly extending C-shaped lug members secured to the bottom portion adjacent the rear end thereof, the combination of a convertible barrow comprising a pair of spaced apart bar members which extend normally substantially horizontally, said bar members at their forward ends being supported by an axle and wheel assembly, a transversely extending auxiliary container interconnecting said bar members adjacent the rear end thereof, a pair of vertically downwardly extending hook members one secured to each of said bar members intermediate of the ends thereof, said hook members being adapted to cooperate with the ends of the axle of the hose reel for supporting the latter, a transversely extending brace member interconnecting said bar members adjacent the forward ends thereof, said transversely extending bar member being adapted to cooperate with the spring clip members at the forward end of the wheel barrow tub, laterally inwardly extending bolt members one secured to each of said bar members intermediate of the ends thereof, and said bolt members being adapted to cooperate one with each of the C-shaped lug members at the rear end of the wheel barrow tub.

PAUL E. BLACKMOND.

References Cited in the file of this patent

UNITED STATES PATENTS

| Number | Name | Date |
|---|---|---|
| 1,450,006 | More | Mar. 27, 1923 |
| 2,221,834 | Garlinghouse | Nov. 19, 1940 |
| 2,242,068 | Harris | May 13, 1941 |
| 2,481,224 | Joswick | Sept. 6, 1949 |
| 2,488,425 | Morrone | Nov. 15, 1949 |